(12) United States Patent
Weissman et al.

(10) Patent No.: US 7,689,536 B1
(45) Date of Patent: Mar. 30, 2010

(54) METHODS AND SYSTEMS FOR DETECTING AND EXTRACTING INFORMATION

(75) Inventors: Adam J. Weissman, Santa Monica, CA (US); Gilad Israel Elbaz, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 425 days.

(21) Appl. No.: 10/741,303

(22) Filed: Dec. 18, 2003

(51) Int. Cl.
*G06F 17/30* (2006.01)
(52) U.S. Cl. .............................................. 707/2; 707/3
(58) Field of Classification Search ................. 395/605; 707/1, 2, 100, 3; 434/118
See application file for complete search history.

(56) References Cited

U.S. PATENT DOCUMENTS

| | | | |
|---|---|---|---|
| 4,839,853 A | | 6/1989 | Deerwester et al. |
| 5,325,298 A | | 6/1994 | Gallant |
| 5,404,506 A | | 4/1995 | Fujisawa et al. |
| 5,499,360 A | | 3/1996 | Barbara et al. |
| 5,619,709 A | | 4/1997 | Caid et al. |
| 5,724,571 A | * | 3/1998 | Woods .......................... 707/5 |
| 5,778,363 A | | 7/1998 | Light |
| 5,778,364 A | | 7/1998 | Nelson |
| 5,796,913 A | * | 8/1998 | Takada et al. ................ 386/125 |
| 5,845,278 A | | 12/1998 | Kirsch et al. |
| 5,848,396 A | | 12/1998 | Gerace |
| 5,878,223 A | | 3/1999 | Becker et al. |
| 5,933,822 A | | 8/1999 | Braden-Harder et al. |
| 5,960,383 A | | 9/1999 | Fleischer |
| 6,044,375 A | | 3/2000 | Shmueli et al. |
| 6,067,552 A | | 5/2000 | Yu |
| 6,101,515 A | | 8/2000 | Wical et al. |
| 6,119,164 A | | 9/2000 | Basche |
| 6,134,532 A | | 10/2000 | Lazarus et al. |
| 6,269,361 B1 | | 7/2001 | Davis et al. |
| 6,289,342 B1 | | 9/2001 | Lawrence |

(Continued)

FOREIGN PATENT DOCUMENTS

| | | |
|---|---|---|
| EP | 1160686 | 12/2001 |
| WO | WO 00/79436 | 12/2000 |

OTHER PUBLICATIONS

Kaszkiel et al.., "Passage retrieval revisited", Proceedings of the 20th annual international ACM SIGIR conference on Research and development in information retrieval, Mar. 1997, p. 178-185. Retrieved from the Internet<URL: http://portal.acm.org/ft_gateway.cfm?id=258561&type=pdf&coll=GUIDE&dl=GUIDE&CFID=56563362&CFTOKEN=17259154>.*

(Continued)

*Primary Examiner*—Jean B. Fleurantin
*Assistant Examiner*—Dennis Myint
(74) *Attorney, Agent, or Firm*—Fish & Richardson P.C.

(57) ABSTRACT

Systems and methods that detect information and extract information are described. In one aspect, target rules are defined for detection of target hits in an article, including defining a target article region, extraction rules are defined based on the target rules for the extraction of extracts from the article, including an extraction article region, target rules are applied to each target article region of the article to determine target hits, and extraction rules are applied to detect at least one extract from the article based on the determined target hit.

43 Claims, 2 Drawing Sheets

U.S. PATENT DOCUMENTS

| | | | |
|---|---|---|---|
| 6,289,353 | B1 | 9/2001 | Hazlehurst et al. |
| 6,298,348 | B1 | 10/2001 | Eldering |
| 6,314,419 | B1 | 11/2001 | Faisal |
| 6,324,519 | B1 | 11/2001 | Eldering |
| 6,324,538 | B1 | 11/2001 | Wesinger et al. |
| 6,421,675 | B1 | 7/2002 | Ryan et al. |
| 6,453,315 | B1 | 9/2002 | Weissman et al. |
| 6,473,730 | B1 | 10/2002 | McKeown et al. |
| 6,484,161 | B1 | 11/2002 | Chipalkatti et al. |
| 6,594,658 | B2 * | 7/2003 | Woods ............ 707/5 |
| 6,651,058 | B1 * | 11/2003 | Sundaresan et al. ............ 707/6 |
| 6,685,475 | B1 * | 2/2004 | Maruyama et al. .......... 434/118 |
| 6,763,349 | B1 * | 7/2004 | Sacco ............ 707/3 |
| 7,024,624 | B2 * | 4/2006 | Hintz .......... 715/532 |
| 2001/0049674 | A1 * | 12/2001 | Talib et al. ............ 707/1 |
| 2002/0022956 | A1 * | 2/2002 | Ukrainczyk et al. ............ 704/9 |
| 2002/0099700 | A1 | 7/2002 | Li |
| 2002/0165849 | A1 | 11/2002 | Singh et al. |
| 2002/0174101 | A1 * | 11/2002 | Fernley et al. ............ 707/1 |
| 2003/0115191 | A1 * | 6/2003 | Copperman et al. ............ 707/3 |
| 2003/0126235 | A1 | 7/2003 | Chandrasekar et al. |

OTHER PUBLICATIONS

Mittendorf et al., "Document and passage retrieval based on hidden Markov models", Proceedings of the 17th annual international ACM SIGIR, Jul. 1994, p. 318-327. Retrieved from the Internet: <URL: http://portal.acm.org/ft_gateway.cfm?id=188593&type=pdf &coll=GUIDE&dl=GUIDE&CFID=56564622 &CFTOKEN=53137344L>.*

Lin, Shian-Hua et al. Discovering Informative Content Blocks from Web Documents, Proceedings of the ACM SIGKKD International Conference on Knowledge Discovery and Data Mining, Jul. 23, 2002—Jul. 26, 2002, pp. 588-593, Edmonton, Alberta Canada.

Kerschberg, et al., "A Semantic Taxonomy-Based Personalizable Meta-Search Agent," Conference Proceedings Article, vol. 1. Dec. 3, 2001.

Voss, et al., "Concepts as Knowledge Handles in Collaborative Document Management," Enabling Technologies: Infrastructure for Collaborative Enterprises. 1999.

Apted, et al., "Visualization of Ontological Inferences for User Control of Personal Web Agents," Proceedings of the Seventh conference on Information Visualization (IV '03).

U.S. Appl. No. 09/493,701, filed Jan. 28, 2000, Weissman, et al.

"Applied Semantics Launches Contextual Targeting Pay-For-Performance Ad Serving Solution", Applied Semantics—Press Release, Oct. 21, 2002, pp. 1-2, http://www.appliedsemantics.com/ne/ne_pr_102102.html.

"Applied Semantics Launches News Series to Power Publishing", Applied Semantics, Inc.—Press Release, Aug. 13, 2002, pp. 1-2, http://www.appliedsemantics.com/ne/ne_pr_081302.html.

"Applied Semantics News Series," pp. 1-4, brochure, no date.

Chi et al. "Context Query in Information Retrieval", Proceedings of the 14th IEEE International Conference on Tools with Artificial Intelligence, IEEE Comp. Soc, vol. Conf. 14, Nov. 2002, pp. 101-106.

"CIRCA Technology Overview," Applied Semantics White Paper, Jul. 2001, pp. 1-10.

"CONVERA—Products: RetrievalWare," printed Oct. 30, 2003, http://www.convera.com/products/rw_precisions.asp.

Fellbaum, C., ed. "WordNet: An Electronic Lexical Database", Cambridge: The MIT Press, Mar. 1998, pp. 117-127, 285-303. P325.5. D38W67 1998.

Geller, M., "Quigo Signs Deal with Overture", *MediaDailyNews*, Aug. 13, 2003, pp. 1-3, http://www.mediapost.com/dtls_dsp_news.cfm?newsID=215196.

Koll, M.B., "Information Retrieval Theory and Design Based on a Model of the User's Concept Relations", Proceedings of the 3rd Annual ACM Conference on Research and Development in Information Retrieval, 1980, pp. 77-93.

"Ontology Usage and Applications", Applied Semantics Technical White Paper, Jul. 2001, pp. 1-15.

"Powerful Revenue Solutions for Online Publishers", Applied Semantics AdSense, pp. 1-2. brochure, no date.

Tengi, R.I., "Design and Implementation of the WordNet Lexical Database and Searching Software", in *WordNet: An Electronic Lexical Database*, Fellbaum C. ed., Cambridge: The MIT Press, Mar. 1998, pp. 105-127.

"Verity Introduces Customizable Industry and Enterprise Taxonomies", Verity, Nov. 17, 2003, pp. 1-2.

Voorhees, E.M., "Query Expansion Using Lexical-Semantic Relations", Proceedings of the 17th Annual ACM Conference on Research and Development in Information Retrieval, Aug. 1994, pp. 61-69.

* cited by examiner

METHODS AND SYSTEMS FOR DETECTING AND EXTRACTING INFORMATION

FIELD OF THE INVENTION

The invention generally relates to information extraction. More particularly, the invention relates to methods and systems for detecting and extracting information from articles.

BACKGROUND OF THE INVENTION

Improving mechanisms for searching and extracting information from vast numbers of documents, such as those available via the World Wide Web ("web") or on large enterprise computer networks, has increasingly been an area of focus and research. Documents are, for example, web pages of various formats, such as HTML, XML, XHTML, Portable Document Format (PDF) files, and word processor, database, and application program document files. This is especially due to the continued growth in the number of computer users, services and applications offered for example on the web, and the amount of information being added to the web, enterprise computer networks and other databases.

A search engine or search engine program is a widely used mechanism for allowing users to search vast numbers of documents for information. Generally, a search engine provides a user interface that includes a query field. A user can enter one or more search terms describing the desired information in the query field. In response to a query, the search engine attempts to locate, rank, sort and then return for display the search results, usually as a list of relevant documents. In some cases, such as a web search engine, a hyperlink to each document is included in the list. The list can also contain an excerpt of text from the document meant to summarize the content corresponding to the link to aid the user in assessing the relevance of each search result.

Typically, search engines match the search terms to the documents as a whole. If the user is interested in specific information, for example, "sharks", but a particular document about "beaches around the world", for example, only has one sentence about sharks, it is unlikely that the search engine would return the document. Documents like the one described are likely to score very low under the query for "sharks", if at all, because the document as a whole is not "about" sharks. Yet the specific sentence within this document may be what the user is looking for. Search engines typically do not allow users to detect and extract such details within documents. Conventional search engines generally do not allow the user to specify portions of the documents to be returned in the search results.

Methods of complex searching exist, but most of these methods of complex searching are term based. For example, an advanced Boolean search or an advanced fuzzy text search are both based on terms. With a term search, documents are converted into a list of terms with relative rankings and the document's terms are compared with the defined search terms or with similar terms having similar rankings. The problem with such term searches is that words have multiple meanings, synonyms could have been used, and the typical algorithms used are not good at determining the importance of terms if those terms are not used frequently. Further, it is difficult to search for a concept using term-based searching methods. For example, if it is desired to search all documents that mention the concept "California cities", each city must be enumerated as a search term.

SUMMARY

Embodiments of the present invention comprise methods and systems for detecting and extracting information from articles. One aspect of an embodiment of the present invention comprises defining target rules for detection of target hits in an article, including defining a target article region, defining extraction rules based on the target rules for the extraction of extracts from the article, including an extraction article region, applying target rules to each target article region of the article to determine target hits, and applying extraction rules to detect at least one extract from the article based on the determined target hit. One embodiment further comprises extracting at least one extract from the article based on the determined target hit. Additional aspects of the present invention are directed to computer systems and to computer-readable media having features relating to the foregoing aspects.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

The present invention comprises methods and systems for detecting and extracting information from articles. Reference will now be made in detail to exemplary embodiments of the invention as illustrated in the text and accompanying drawings. The same reference numbers are used throughout the drawings and the following description to refer to the same or like parts.

Figure 1:
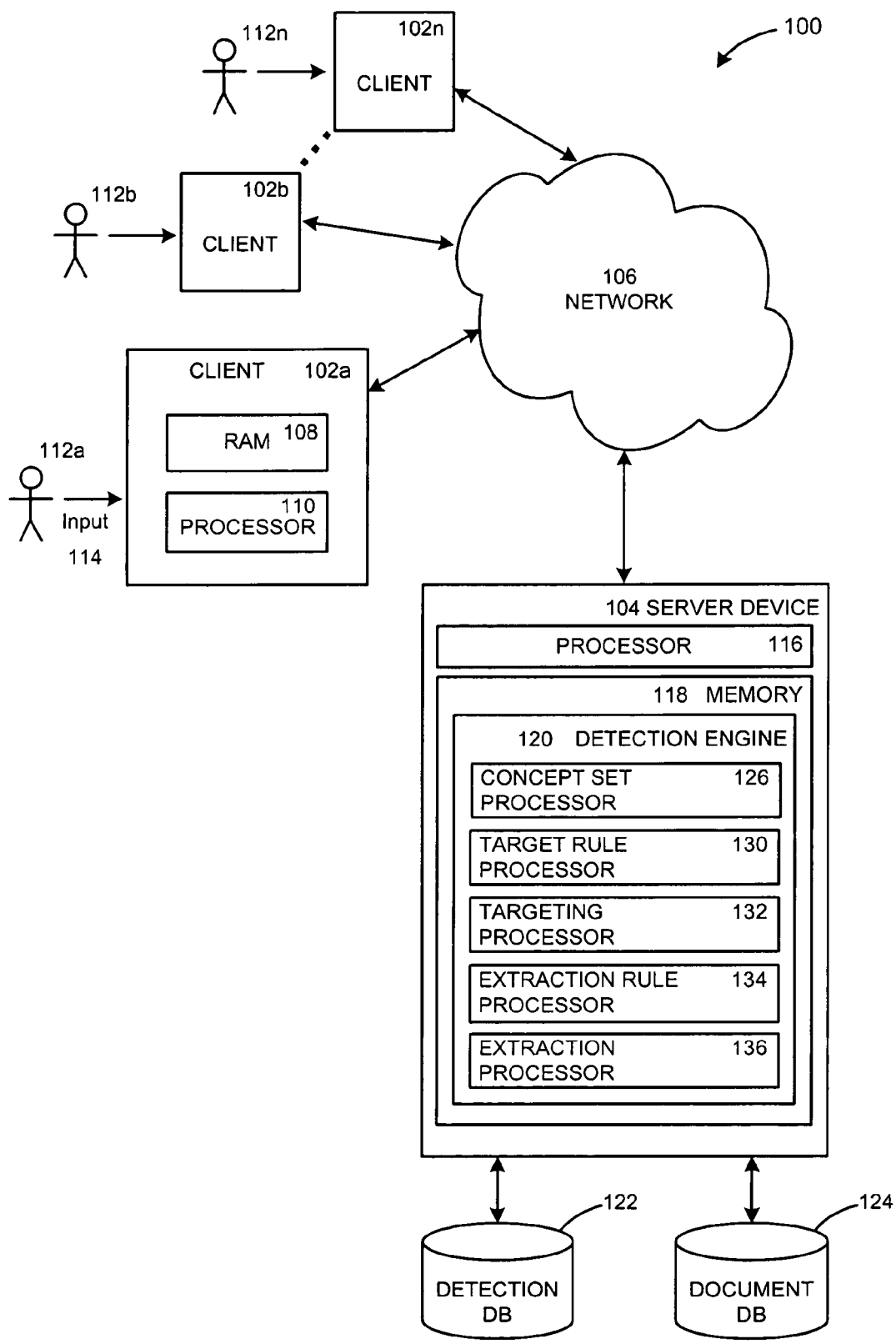
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, a server device 104 and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108, in the embodiment shown coupled to a processor 110. The processor 110 executes a set of computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n are personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a user interface application program and/or a browser application program such as Internet Explorer™, version 6.0 from Microsoft Corporation, Netscape Navigator™, version 7.1 from Netscape Communications Corporation, and Safari™, version 1.0 from Apple Computer. Through the client devices 102a-n, users 112a-n can communicate over the network 106 with each other and with other systems and devices coupled to the network 106.

As shown in FIG. 1, server device 104 is also coupled to the network 106. The server device 104 shown includes a server executing a detection engine program. The system 100 can also include multiple other server devices. Similar to the client devices 102a-n, the server device 104 shown includes a processor 116 coupled to a computer readable memory 118. The server device 104 is depicted as a single computer system, but may be implemented as a network of computer processors. Examples of server device 104 are servers, mainframe computers, networked computers, a processor-based device and similar types of systems and devices. Client processors 110 and server processor 116 can be any of a number of well known computer processors, such as processors from Intel Corporation of Santa Clara, Calif. and Motorola Corporation of Schaumburg, Ill.

Memory 118 of the server device 104 contains a detection engine application program, also known as a detection engine 120. The detection engine 124 detects information in articles and extracts information from articles. Articles include documents, for example, web pages of various formats, such as HTML, XML, XHTML, Portable Document Format (PDF) files, and word processor, database, and application program document files, audio, video, or any other information of any type whatsoever made available on a network (such as the Internet or intranet), a personal computer, or other computing or storage means. The embodiments described herein are described generally in relation to documents, but embodiments may operate on any type of article.

The detection engine 120 shown includes a concept set processor 126, a target rule processor 130, a targeting processor 132, an extraction rule processor 134 and an extraction processor 136. In the embodiment shown, each comprises computer code residing in the memory 118. The concept set processor 126 can allow a user to create concept sets. In one embodiment, a user 112a can interact with the concept set processor 126 through an associated client device 102a via the network 106 to define concept sets. The user can use input devices, such as a keyboard and a mouse, to define concept sets through a user interface program. The concept sets are then received by the concept set processor 130. A concept set can contain a list of concepts that can be combined with set operations, such as, for example, AND, OR, and AND NOT. Each concept list can contain an origin concept, relations between the origin concept and other concepts, and distances associated with each relation.

The target rule processor 132 determines the target rules. In one embodiment, a user 112a can interact with the target rule processor 130 through an associated client device 102a via the network 106 to define the target rules. The user can use input devices, such as a keyboard and a mouse, to define the target rules through a user interface program. The target rules are then received by the target rule processor 130. The target rules specify a target definition, a target scope that can be a document region and a target score formula to score the detected information. A document region can be any region contained in a document or documents, such as a term, a concept, a sentence, a paragraph, or a document.

The targeting processor 132 accesses a document and applies the target rules to the document. In one embodiment, each document received by the targeting processor is preprocessed to determine the concepts contained in the document and/or a gist of the document. In one embodiment a concept is a lexical concept that can be defined by a group of related words, relationships with related concepts, the strength of the relationship, and other statistics about concept usage in language. In another embodiment, a concept is a cluster of words. A gist can be a representation of the overall meaning of the document. In one embodiment, a gist contains weighted concepts. The document can be received from document database 120, another server device connected to the network 106 or another device. The targeting processor 132 applies the target rules to the received document to determine a target score for each document region specified by the scope. For example, for a sentence target scope the targeting processor 132 can calculate a target score for each sentence in the document. A target hit is a document region that is determined to be relevant based on the target score. In one embodiment, a target hit is a document region with a non-zero target score.

The extraction rule processor 134 determines the extraction rules. In one embodiment, a user 112a can interact with the extraction rule processor 134 through an associated client device 102a via the network 106 to define the extraction rules. The user can use input devices, such as a keyboard and a mouse, to define the extraction rules through a user interface program. The extraction rules are then received by the extraction rule processor 134. The extraction rules specify an extraction scope that can define the document region to be extracted, output rules and the associated target rules. The extraction processor 136 applies the extraction rules to the accessed document and outputs extracts according to the extraction rules.

Server device 104 also provides access to other storage elements, such as a detection storage element, in the example shown a detection database 120, and a document storage element, in the example shown a document database 124. The detection database 120 can be used to store predefined target rules and extraction rules, and previous extracts. The document database 122 can be used to store preprocessed documents. Data storage elements may include any one or combination of methods for storing data, including without limitation, arrays, hashtables, lists, and pairs. Other similar types of data storage devices can be accessed by the server device 104.

It should be noted that the present invention may comprise systems having different architecture than that which is shown in FIG. 1. For example, in some systems according to the present invention, the targeting processor 132 and extraction processor 136 may not be part of the detection engine 120, and may carry out their operations offline. The system 100 shown in FIG. 1 is merely exemplary, and is used to explain the exemplary method shown in FIG. 2.

Various methods in accordance with the present invention may be carried out. One exemplary method according to the present invention comprises defining target rules for detection of target hits in an article, including defining a target article region, defining extraction rules based on the target rules for the extraction of extracts from the article, including an extraction article region, applying target rules to each target article region of the article to determine target hits, applying extraction rules to detect at least one extract from the article based on the determined target hit, and extracting at least one extract from the article based on the determined target hit. Multiple target hits can be determined for a single article and multiple extracts can be extracted from a single article. In some circumstances, no target hits are determined for an article and no extracts are extracted from an article. The target article region can be a document, a paragraph, a sentence, a concept, or a term and the extraction article region can be a document, a paragraph, a sentence, a concept, or a term. In one embodiment, a plurality of target hits are detected and a plurality of extracts are extracted and the plurality of extracts are sorted based on the extraction rules. In one embodiment, the article can be preprocessed to determine concepts contained in the article and a gist for the article.

In one embodiment, the target rules also comprise a target definition and a target score formula and applying the target rules comprises using the target score formula to detect target hits. The target definition can comprise a concept set, a gist or both. A concept set can be a list of concepts combined with set operations, and each concept list can be defined by an origin concept, a relation and a distance of relation value. Distance can be a representation of the strength of the relationship between the origin concept and an evaluated term. The concept set can be predefined by a user. A gist can be a vector of weighted concepts. The gist can be defined by a user or can be a calculated gist of the article.

Figure 2:
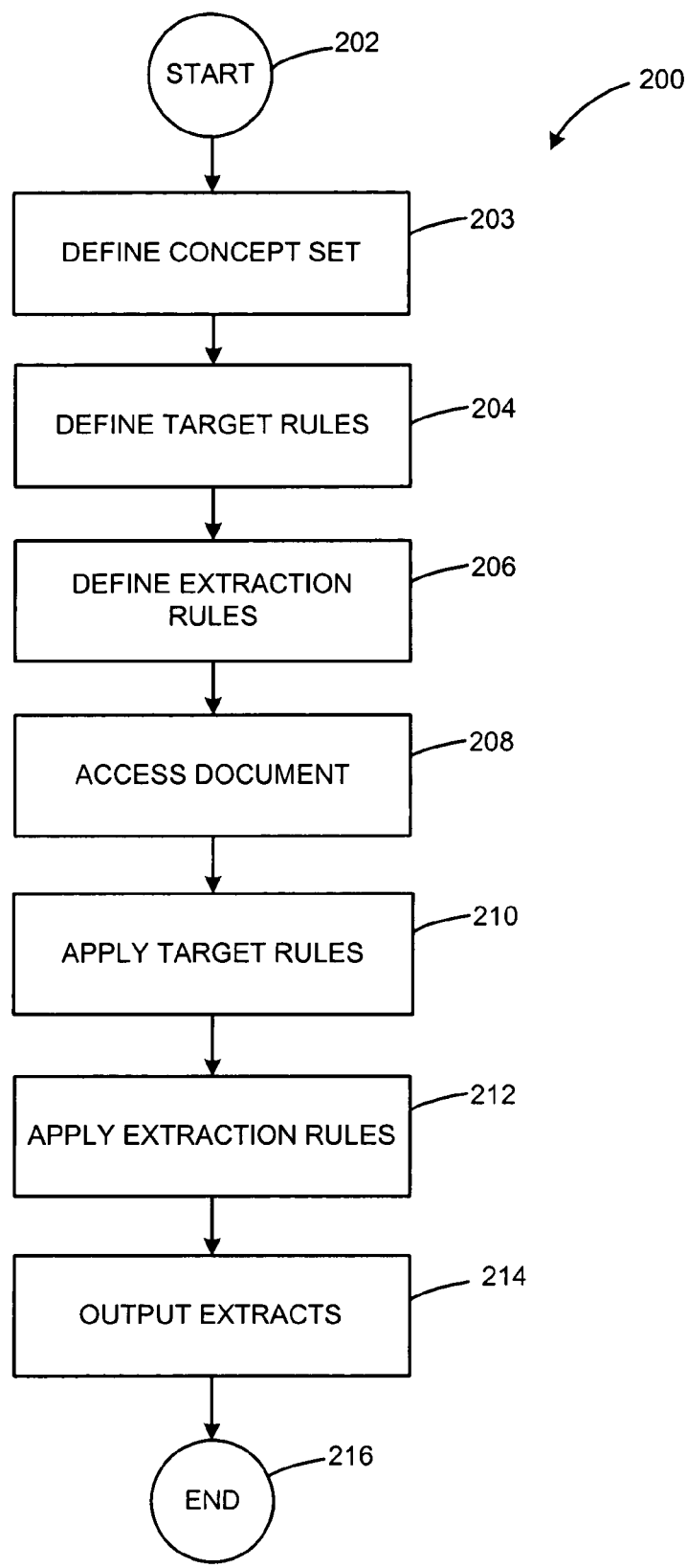
FIG. 2 illustrates a flow diagram of a method in accordance with one embodiment of the present invention.

FIG. 2 illustrates an exemplary method 200 in accordance with the present invention in detail. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2. The method 200 shown provides a method for detecting information in documents and extracting the information from documents.

Each block shown in FIG. 2 represents one or more steps carried out in the exemplary method 200. Referring to FIG. 2 in block 202, the example method 200 begins. Block 202 is followed by block 203, in which a concept set is defined. In one embodiment, a concept set can be defined by a user 212*a* on a client device 202*a* interacting with the concept set processor 126. The concept set processor 126 allows the user, through a user interface, to define the concept set. In one embodiment, a concept is a lexical concept that can be defined by a group of related words, relationships with related concepts, the strength of the relationship, and other statistics about concept usage in language. In another embodiment, a concept is a cluster of words. A concept set can contain a list of concepts that can be combined with set operations, such as, for example, AND, OR, and AND NOT. Each concept list can contain an origin concept, relations and distances. Relations can define a relationship between the origin concept and an evaluated concept and can be, for example, "is a product of", "is a part of", "is a kind of", "has kind", and "has part". The relation "single concept" can be used when no relations are desired. A distance can be a representation of the strength of the relationship between the origin concept and an evaluated concept. If the relation is "single concept", the distance is zero. By choosing a distance of "unlimited" requires only that some relationship exits, no matter what the strength. For example, an origin concept of "dog", a relation of "is a kind of" and a distance of "unlimited" can produce a list of all types of dogs. Another concept list can be defined with an origin concept of "cataract", a relation of "single concept", and a distance of "0". This "cataract" concept can then be combined with the "dog" concept using the AND operation to define a concept set concerning cataract problems with dogs.

Block 203 is followed by block 204, in which target rules are defined. In one embodiment, target rules can be defined by a user 212*a* on a client device 202*a* interacting with the target rule processor 130. The target rule processor 130 allows the user through a user interface to define target rules. Target rules specify a particular kind of target to be detected and the rules for how a hit on the target should be scored. The target rule processor 130 can allow a user to select from predefined rules or can allow the user to define new rules.

Target rules can include a target definition, a target scope and a target score formula. The target definition is what the user wants to detect and can relate to a single concept or multiple concepts. The target scope defines the size of a document region the user wishes to identify and can be, for example, a document, a paragraph, a sentence, a concept, or a term. The target score formula is used to determine a target score for each document region as specified in the target scope. The target score represents how well the requirements for the target rule are satisfied by the document region. A target hit is a document region that is determined to be relevant based on the target score and can be a document region with a non-zero target score.

The target definition can be simple or can be complex having multiple sub-rules. A target can be defined by a contributor or multiple contributors. Contributors can be a concept, a concept set, a gist or a combination thereof. A gist can be, for example, a vector of weighted concepts. For example, a gist can be the list of concepts concerning computer manufactures, computer mouse and China and can be weighted 40%, 40% and 20% respectively. A user can define a gist or specify that an existing gist determined for a document region, such as a document, be used.

Each contributor can have a specific method that describes the kind of comparison to be performed when evaluating whether a contributor is present in a document. For example, a contributor can have an associated categorization-like method, an inverse categorization-like method, a similarity to gist method or a concept set hit method. The first three methods can be used when the contributor is a gist and the fourth method can be used when the contributor is a concept set.

For the categorization-like method, every region gist in a document is "categorized into" a specified gist. An example of this type of method is the detection of "sentences about topics within sports". A contributor is defined for the target rule that has a sentence target scope and the categorization-like method, with the gist specified as the concept "sports". Sentences that have meanings that could be categorized under the wider topic of "sports" will receive target scores for such a rule, based on how well they relate.

With the inverse categorization-like method, the contributor acts as the "category" into which the specified gist is "categorized". An example of this type of method is the detection of "concepts that represent topics into which Fred Astaire might be categorized". This might lead to concepts such as "movies", "actor", and "dancing" to be recognized in a document region and used as contributors for the target rule.

The similarity to gist method blends the previous two methods. With this method, the gist of a potential contributor is tested against the gist specified in the rule in both directions, to see if either categorizes well into the other. The effect of this is to detect any potential contributors that are closely related to the gist in the rule, containing either narrower or broader related topics.

In the three methods above that require a gist to be specified, a user can define the gist or the user can specify that the gist of a document region be used. If a user defines a gist, as in the examples above, the detection is performed against the values of the gist specified. However, instead of requiring a specific gist, a user can request that the gist of the detected document region be used, which changes the nature of the contributor. For example, instead of looking for "sentences about sports", the rule can instead be looking for "sentences about what the document as a whole is about".

The concept set hit method involves looking for a contributor that has a match for a concept set. A concept set can be specified that contains a list of concepts of interest and can be combined with set operations. The concept set can be created separately by the user and stored in the detection database 122. If any of the concepts in this list are found in the text, a contributor to the targeting rule can be created. An example of this method is in the detection of "NASDAQ companies" appearing in a document. First, a concept set defining the list of companies is created. Then a targeting rule is created that has a contributor with a term scope. The concept set hit method is then requested, and the "NASDAQ companies" concept set is named as the one to use.

The target score assigned to a contributor using the concept set hit method is based on the likelihood that the desired concept or concepts actually appeared in the document region. This value may depend on the ambiguity of the term in question. The term "Microsoft" has extremely high likelihood of representing the concept of Microsoft Corporation. However, the term "bank" has a low base likelihood of meaning "river bank", and therefore the score for this term, as a representative of the concept set containing the concept "river bank", may be low.

The target score formula can be selected from a list of predefined formulas or can be defined by the user. In the target score formula, the contributors act like variable names and are combined together using mathematical operators to produce a final score.

For example, consider a target rule that has two contributors. The first contributor is named "SoftwareMakers" and looks for matches on a concept set that defines a set of software companies. The second contributor is named "Publishers" and uses a concept set containing a set of publishers. In one example, the user desires to identify any sentence that mentions either a software company or a publisher, and if both appear, it's even better. In this example, the scores for each contributor can be added together and the target score formula can be like equation 1.1 below.

$$\text{SoftwareMakers} + \text{Publishers} \qquad 1.1$$

Turning to a more complex example, suppose it is desired that the score end up as a value between 0 and 1 and that the identification of publishers should contribute more to the score for the target than software companies (a 75/25 split, for example). The score formula for this example can be like equation 1.2 below.

$$(0.25*\text{SoftwareMakers}) + (0.75*\text{Publishers}) \qquad 1.2$$

In a further complex example, it is desired to identify a document region that contains both a software company and a publisher, when the software company and publisher are above a certain threshold. The score formula for this example can be like equation 1.3 below.

$$(\text{SoftwareMakers}*(\text{SoftwareMakers}>0.1)) + (\text{Publishers}*(\text{Publishers}>0.1)) \qquad 1.3$$

Block 204 is followed by block 206, in which extraction rules are defined. In one embodiment, the extraction rules are defined by a user 212a on a client device 202a interacting with the extraction rule processor 134. The extraction rule processor 134 allows the user through a user interface to define extraction rules. Extraction rules specify what kind of document region is to be extracted from the document and what target rules must be hit within these regions in order for them to be deemed significant.

Extraction rules can include an extraction scope, a sort order, and the targeting rules to which the extraction rules relate. The extraction scope can define the document region to be extracted and can be, for example, document, paragraph, sentence, concept, or term. In one embodiment, the extraction scope is equal to or greater than the target scope. The sort order is the order in which the extracts can be displayed to the user or stored, such as, for example, score, alphabetical, ascending and descending. Score order can be based on an aggregated score calculated for the extracts. The aggregate score can be a maximum, minimum, sum, count, or average of all the target scores for the extract. The target hits and target scores are used by the extraction rules to determine what to extract. A user can define a threshold in the extraction rules that the target score must be equal to, or greater than, or less than in order for the target hit to be extracted. The extraction rules can also contain rules concerning the output form of text. For an example with a sentence target scope, the entire document can be extracted with the sentences considered target hits highlighted.

Block 206 is followed by block 208, in which a document or multiple documents are accessed. The documents can be accessed and received by the detection engine from the document database 124, another server device via network 106 or another device. In one embodiment, the documents can be preprocessed prior to access to determine the concepts contained in each document and the gist of each document.

Block 208 is followed by block 210, in which the target rules are applied to each document by the targeting processor 132. Each document is processed to determine a target score for each document region contained in the document by applying the target rules. The document region is defined by the target scope. The granularity of the processing can depend on the target scope and the contributor type. For example, if a contributor is a user's defined gist and the target scope is the document, then the processing granularity is the document. If a contributor is a user's defined gist and the target scope is a sentence then the processing granularity is every sentence, such that the target score formula is evaluated at every sentence. If the contributor is a concept set and the target scope is a sentence, then each term in the document is evaluated against the concept set and the target score formula is evaluated for every sentence. In one embodiment, a target hit is determined by a non-zero target score. At the end of block 210 the target hits with associated target scores for each document have been determined.

Block 210 is followed by block 212, in which the extraction rules are applied to each document by the extraction processor 136. The target score for each target hit can be evaluated by the extraction processor 136 using the extraction rules. Each target hit that meets the requirements of the extraction rules is marked for extraction and considered an extract. In one embodiment, the extraction processor 136 checks to see if the extract corresponds to an existing extract. The existing extract can be stored, for example, in the detection database 122. If an existing extract exists, it is called up by the extraction processor 136. Once an extract exists, either through calling up an existing extract or determining an extract, the extraction processor 136 computes an aggregated score for the extract. The aggregated score can be the aggregate of the individual target scores for the extract.

When all extracts have been determined for the documents, the extraction processor 136 processes the extracts according to any output limitations specified in the extraction rules. For example, if the extraction rules specify allowing a specified number of extracts, the extracts are sorted by score, a cutoff point is determined based on the specified number, and the list of extracts is truncated. The extraction rules can further specify sorting the extracts, such as in alphabetical, ascending or descending order and the extracts are, thus, further sorted by the extraction processor 136. If the extraction rules specify specific formatting of the extracts, the extraction processor 136 processes the extracts for the formatting. For example, the extraction rules can specify that certain concepts are highlighted or sentences containing certain concepts are highlighted.

Block 212 is followed by block 214, in which extracts are output. The extracts can be output from the extraction engine to a user's client device through the network 106. Alternatively, the extracts can be output to another device on the network 106 and/or stored in the database 120 or other storage device.

Block 214 is followed by block 216, in which the method ends.

Information that can be detected and extracted using one embodiment of the present invention can be, for example, without limitation, the following:
  Specific words or concepts appearing in a document;
  Sentences that mention certain concepts, or that are conceptually related to a concept;
  Combine multiple requirements together, in order to look for things that are more complex; for example, to find and extract any sentence in a document that contains mention of both a NASDAQ company and a concept related to "layoffs";
  Summarize a document, by selecting the sentences that are most closely related to the overall meaning of the document; and
  Control output when targets are detected, including marking up the original text.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method for extracting information from an electronic document using a computer server system having one or more processors, the method comprising:
  receiving, at the server system, a request for information that includes a definition of a concept list comprising an origin concept, a relationship between the origin concept and an evaluated concept, and a distance representing a strength of the relationship between the origin concept and the evaluated concept, and a target scope that characterizes a size of document regions to which the concept list is to be applied, wherein the request for information and the target scope are received from a user interacting with the server system through a client device connected to the server system via a network;
  receiving, at the server system a definition of an extraction rule, wherein the extraction rule definition comprises an extraction scope that characterizes document regions to be extracted;
  the server system determining a target score for document regions of the article, wherein the score represents how well document regions of the size to which the concept list is to be applied relate to the concept list;
  the server system applying the extraction rule to the article to extract document regions characterized by the extraction scope from the article, wherein the application of the extraction rule is based on the determined target score; and
  outputting the extract from the server system for the client device in response to the request for information.

2. The method of claim 1, wherein applying the extraction rule comprises extracting a plurality of extracts.

3. The method of claim 2, further comprising the server system sorting the extracts based on the extraction rule.

4. The method of claim 1, further comprising the server system selecting a first extract from the article for output based on the target score.

5. The method of claim 1, further comprising receiving, at the server system, a target score formula for determining the target score.

6. The method of claim 5, wherein determining the target score comprises using the target score formula.

7. The method of claim 1, wherein the request for information further comprises a gist defined as a vector of weighted concepts.

8. The method of claim 7, wherein the gist comprises a user defined gist.

9. The method of claim 7, wherein the gist comprises a calculated gist of a document region.

10. The method of claim 1, wherein the request for information further comprises a concept set that comprises the concept list and a second concept.

11. The method of claim 10, wherein the second concept comprises a product of set operations on two or more other concepts.

12. The method of claim 10, wherein the concept set further comprises at least one set operation.

13. The method of claim 12, wherein the set operation comprises one of "AND", "OR", and "AND NOT".

14. The method of claim 1, wherein the document region characterized by the target scope comprises an article, a sentence, or a term.

15. The method of claim 1, wherein the document region characterized by the extraction scope comprises an article, a sentence, or a term.

16. The method of claim 1, further comprising the server system preprocessing the article, wherein preprocessing comprises:
  determining at least one concept associated with the article; and
  determining a gist of the article.

17. The method of claim 1, wherein
the origin concept comprises a group of related words, relationships with other concepts, the strengths of the relationships, and statistics regarding the usage of the origin concept in a language.

18. The method of claim 1, wherein receiving the definition of the extraction rule further comprises receiving a definition of a sort order in which extracts are to be sorted for output.

19. The method of claim 1, wherein the distance comprises a numeric representation of the strength of the relationship between the origin concept and the evaluated concept.

20. The method of claim 1, wherein the relationship comprises one of "is a product of", "is a part of", "is a kind of", "has kind", or "has part".

21. The method of claim 1, wherein the origin concept comprises at least one search term.

22. An article for extracting information from an electronic document using a computer server system having one or more processors, the article comprising one or more computer-readable data storage media containing program code operable to cause one or more machines of a server system to perform operations, the operations comprising:
receiving, from a user, a request for information that includes a definition of a concept list comprising an origin concept, a relationship between the origin concept and an evaluated concept, and a distance representing a strength of the relationship between the origin concept and the evaluated concept, and a target scope that characterizes a size of document regions to which the target rule is to be applied;
receiving, from the user, a definition of an extraction rule, wherein the extraction rule definition comprises an extraction scope that characterizes document regions to be extracted;
determining a target score for document regions of the article, wherein the score represents how well document regions of the size to which the concept list is to be applied relate to the concept list;
applying the extraction rule to the article to extract document regions characterized by the extraction scope from the article, wherein the application of the extraction rule is based on the determined target score; and
outputting the extract in response to the request for information for use by a client device.

23. The article of claim 22, wherein applying the extraction rule comprises extracting a plurality of extracts.

24. The article of claim 23, further comprising sorting the extracts based on the extraction rule.

25. The article of claim 22, further comprising selecting a first extract from the article for output based on the target score.

26. The article of claim 22, further comprising receiving a target score formula for determining the target score.

27. The article of claim 26, wherein determining the target score comprises using the target score formula.

28. The article of claim 22, wherein the request for information further comprises a gist defined as a vector of weighted concepts.

29. The article of claim 28, wherein the gist comprises a user defined gist.

30. The article of claim 28 wherein the gist comprises a calculated gist of a document region.

31. The article of claim 22, wherein the request for information further comprises a concept set that comprises the concept list and a second concept.

32. The article of claim 31, wherein the second concept comprises a product of set operations on two or more other concepts.

33. The article of claim 31, wherein the concept set further comprises at least one set operation.

34. The article of claim 33, wherein the set operation comprises one of "AND", "OR", and "AND NOT".

35. The article of claim 22, wherein the document region characterized by the target scope comprises an article, a sentence, or a term.

36. The article of claim 22, wherein the document region characterized by the extraction scope comprises an article, a sentence, or a term.

37. The article of claim 22, further comprising preprocessing the article, wherein preprocessing comprises:
determining at least one concept associated with the article; and
determining a gist of the article.

38. The article of claim 22, wherein receiving the definition of the extraction rule further comprises receiving a definition of a sort order in which extracts are to be sorted for output.

39. The article of claim 22, wherein the distance comprises a numeric representation of the strength of the relationship between the origin concept and the evaluated concept.

40. The article of claim 22, wherein the relationship comprises one of "is a product of", "is a part of", "is a kind of", "has kind", or "has part".

41. The article of claim 22, wherein the origin concept comprises at least one search term.

42. A computer-implemented method for extracting a subset of a document using a computer server system having one or more processors, the method comprising:
receiving, at the server system, a request for information that describes a combination of two or more concept lists, wherein each concept list is defined by an origin concept, a relationship between the origin concept and an evaluated concept, and a distance representing a strength of the relationship between the origin concept and the evaluated concept, wherein the two or more concept lists are combined using an operation to define a target definition that is to be detected, wherein the request for information is received from a user interacting with the server system through a client device connected to the server system via a network;
receiving, at the server system, a description of a document region targeted for extraction;
accessing a document stored in a document database using the server system;
based on the target definition and the document regions targeted for extraction, using the server system to extract one or more regions of the accessed document; and
the server system outputting the extracted regions for the client device in response to the request for information.

43. The method of claim 42, wherein the origin concepts each comprise a lexical concept defined by a group of related words and relationships with related concepts.

* * * * *

UNITED STATES PATENT AND TRADEMARK OFFICE
CERTIFICATE OF CORRECTION

PATENT NO. : 7,689,536 B1 Page 1 of 1
APPLICATION NO. : 10/741303
DATED : March 30, 2010
INVENTOR(S) : Adam J. Weissman It is certified that error appears in the above-identified patent and that said Letters Patent is hereby corrected as shown below:

Column 1, Line 10:

In claim 1, after "system" insert --,--.

Signed and Sealed this

Twenty-second Day of June, 2010

David J. Kappos
*Director of the United States Patent and Trademark Office*